United States Patent [19]
Emery et al.

[11] Patent Number: 5,581,234
[45] Date of Patent: Dec. 3, 1996

[54] INFANT VEHICLE SEAT ALARM SYSTEM

[76] Inventors: Anna L. Emery; David P. Emery, both of 4112-161 Ave. SE., Bellevue, Wash. 98006

[21] Appl. No.: 509,539

[22] Filed: Jul. 31, 1995

[51] Int. Cl.$^6$ .................................................. B60Q 1/00
[52] U.S. Cl. ................... 340/457.1; 340/457; 297/250.1
[58] Field of Search ............................. 340/457, 457.1, 340/573, 667, 687; 297/217.3, 217.4, 250.1, 251.13, 251.14, 251.15, 251.16, 467

[56] References Cited

U.S. PATENT DOCUMENTS

| | | | |
|---|---|---|---|
| 3,693,147 | 9/1972 | Seo et al. | 340/457.1 |
| 4,429,916 | 2/1984 | Hyde et al. | 297/250 |
| 4,634,177 | 1/1987 | Meeker | 297/250 |
| 4,826,246 | 5/1989 | Meeker | 297/250.15 |
| 4,849,733 | 7/1989 | Conigliaro et al. | 340/457.1 |
| 4,979,777 | 12/1990 | Takada | 297/250.1 |
| 5,260,684 | 11/1993 | Metzmaker | 340/457.1 |

*Primary Examiner*—Jeffery Hofsass
*Assistant Examiner*—Van T. Trieu
*Attorney, Agent, or Firm*—Dean A. Craine

[57] ABSTRACT

An infant seat/carrier alarm system designed to produce an audible or visual warning when the seat/carrier component is initially aligned on the base component, not locked onto the base component, or when the harness is in an unused state. The alarm system has a main circuit which includes a power source, an audible or visual alarm, a main switch, and two double pole switches all connected together in a series. The double pole switches are used to close the main circuit or connect it with a branching circuit thereto. The main circuit is designed to detecting the presence of the seat/carrier component aligned on the base component. Two double pole switches are disposed between the seat/carrier component and the base component which are moved between the two contact positions by the carrying handle when rotated between unlocked and locked positions. The branching circuit includes a normally closed, single pole switch located in the buckle of the harness. When the seat/carrier component is properly aligned and locked on the base component, the alarm is activated when the clip is disconnected from the buckle.

2 Claims, 5 Drawing Sheets

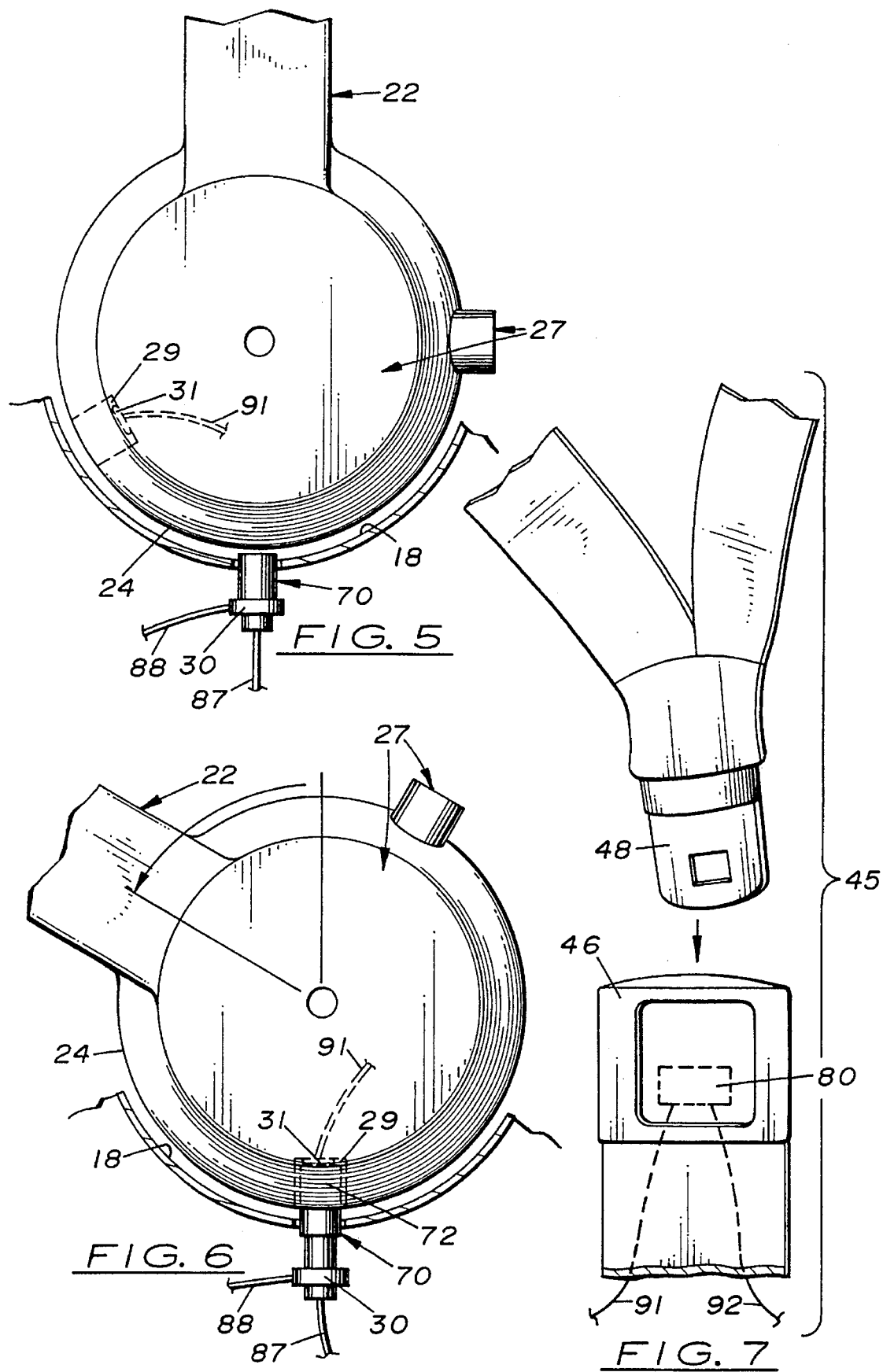

INFANT VEHICLE SEAT ALARM SYSTEM

BACKGROUND OF THE INVENTION

1. Field of the Invention

This invention relates to alarm systems and, more particularly, to alarm systems for infant vehicle seats or carriers.

2. Description of the Related Art

Various infant seat products are available today which use a detachable seat/carrier component that locks into a base component which is held on the vehicle seat via the seat belts. The seat/carrier component includes a U-shaped carrying handle that pivots approximately 90 degrees between an upward extended position and a rearward extended position. When the carrying handle is pivoted into the upward extended position, the seat/carrier component may be initially aligned on the base component. The carrier handle may then be rotated into a rearward extended position to lock the seat/carrier component to the base component. Since the seat belts hold the base component on the vehicle seat, the seat/carrier component is then securely attached to the seat. To detach the seat/carrier from the base component, the carrying handle is pivoted back to the upward extended position and then lifted upward A three-point harness is used to attach the infant to the seat/carrier component. The harness usually includes a clip which inserts into a lower buckle attached to the seat/carrier component. When the clip is connected to the buckle, the infant is securely attached to the infant seat.

In order to securely attach the infant to the infant seat, the seat/carrier component must be properly connected to the base component and the clip must be properly connected to the buckle. Occasionally, they are not, which can lead to injury or death of the infant.

An alarm system is needed that warns the user when the seat/carrier component is disconnected from the base component and when the harness is in an unused state.

SUMMARY OF THE INVENTION

It is an object of the invention to provide an alarm system for a two-piece infant seat that uses a removable seat/carrier component that selectively attaches to a base component that provides an audible or visual warning when the seat/carrier component is initially connected to the base component.

It is another object of the invention to provide such an alarm system in which an audible or visual warning is provided when the seat/carrier component is unlocked from the base component and when the harness is in an unused state.

It is a further object of the present invention to provide such an alarm system which can be easily modified so that it is automatically activated when the seat/carrier component is initially connected to the base component.

It is a still further object of the present invention to provide such an alarm system which has an electric circuit independent of the vehicle's electrical circuit.

The above objects and others which will become apparent to those skilled in the art are accomplished by the means and in the manner set forth herein. Disclosed herein is an alarm system for a two-piece infant car seat designed to warn the user when the seat/carrier component is initially connected in an unlocked condition on the base component and when the harness is in an unused state.

The alarm system has a main circuit which includes a power source, an alarm means and at least one double pole switch all electrically connected together in a series. The main circuit may also include an optional main switch to enable the user to selectively control activation thereof. The alarm system also includes a branching circuit with a single pole switch connected therein which is selectively connected in a series to the main circuit via the double pole switch. The main circuit is designed to detect the presence of the seat/carrier component properly placed on the base component. When the seat/carrier component is placed on the base component, the first contacts in the double pole switch are interconnected to complete the main circuit and activate the alarm means. When the alarm means is initially activated, the user is informed that the seat/carrier is properly aligned on the base component. When the double pole switch is moved so that the second set of contacts are interconnected, the main circuit is in an opened state and the branching circuit is in a closed state.

The position of the double pole switch is controlled by the placement of the seat/carrier component on the base component and by the location of the seat/carrier component's carrying handle. When the seat/carrier component is initially placed on the base component, the double pole switch moves from the second contact position to the first contact position. When the carrying handle is pivoted into the locked position, the double pole switch simultaneously moves from the first contact position back to the second contact position. When in the locked position, the main circuit is in an opened state while the branching circuit is in a closed state.

The branching circuit is connected in a series with the main circuit and controlled via the double pole switch. Located in the branching circuit is a second switch means between the harness's clip and buckle. The second switch means is in a normally closed state so that when the clip is detached from the buckle, the branching circuit is closed and the alarm means is activated. When the clip is inserted into the buckle, the second switch means is opened so that the branching circuit is in an opened state which, in turn, inactivates the alarm means.

The main switch on the main circuit may be turned to the ON position before or after the seat/carrier component has been locked onto the base component and the clip and buckle on the harness has been interconnected. The alarm means provides a warning to the user when the seat/carrier component's carrying handle is initially left in the unlocked position by the user or when it is disposed in the unlocked position by the infant during use. When the carrying handle is pivoted into the locked position, the alarm means is inactivated if the harness is properly connected. If the infant inadvertently moves the carrying handle from the locked position to the unlocked position, the alarm means is automatically activated. If the harness is initially left in the unused state or disconnected by the infant during use, the alarm means is activated.

BRIEF DESCRIPTION OF THE DRAWINGS

FIG. 5 is a front elevation view of the end of the carrying handle disposed in the upward extended position showing the plunger on one push-button switch retracted thereby closing the switch.

FIG. 6 is a front elevation view of the end of the carrying handle showing the carrying handle disposed in the locked position with the plunger on the push-button switch extended into the bore located on the carrying handle, thereby opening the main circuit and closing the branching circuit.

FIG. 7 is a exploded plan view of the harness showing the location of the second switch located in the buckle and the wires connected thereto.

DESCRIPTION OF THE PREFERRED EMBODIMENT(S)

Figure 1:
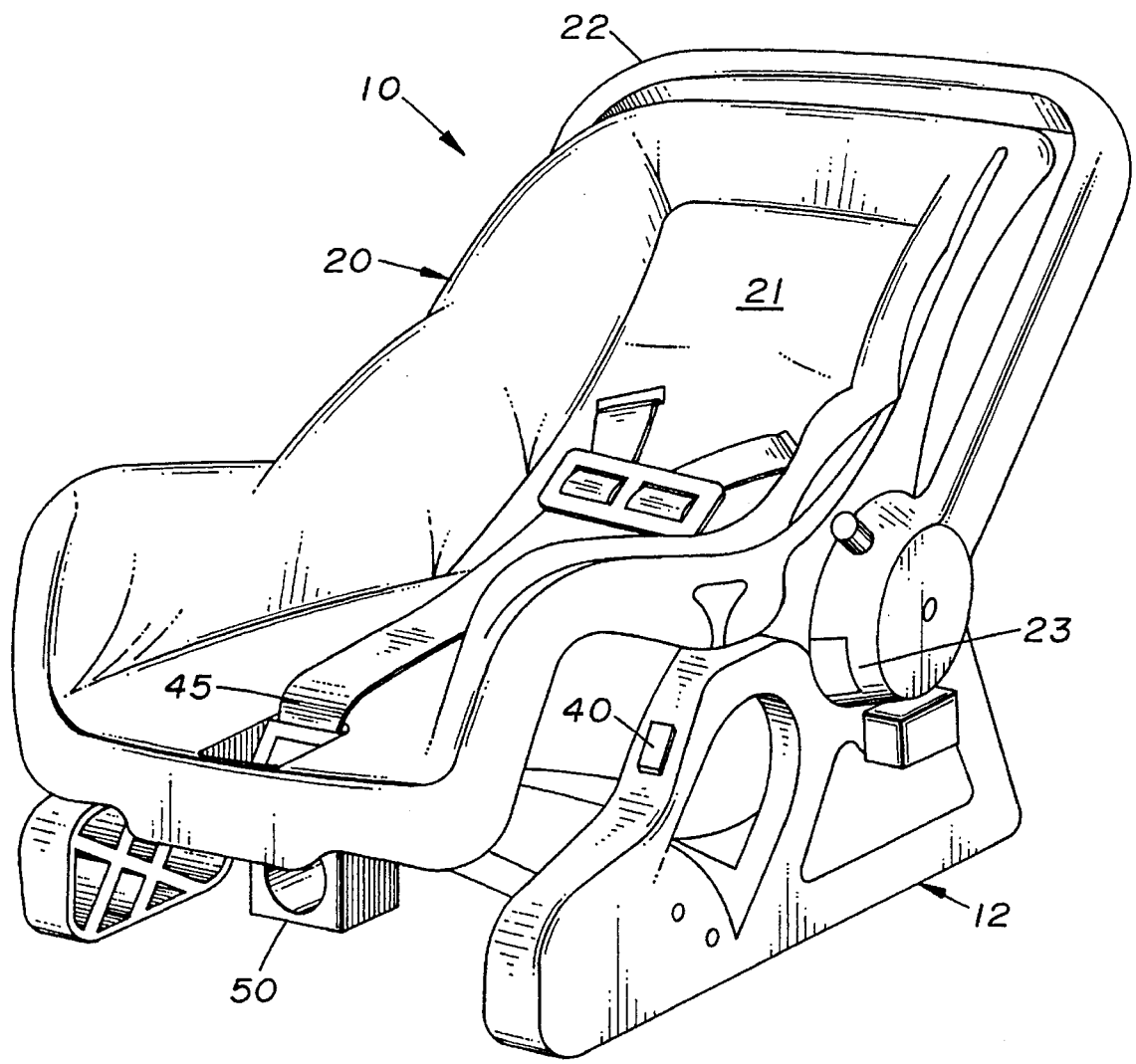
FIG. 1 is a perspective view of a typical infant vehicle seat with the alarm system described herein.

Referring now to the accompanying FIGS. 1–12, there is shown an infant seat alarm system, generally referred to as 8, designed to be used with a typical two-piece infant car seat, generally referred to as 10, which includes a lower base component 12 and an upper seat/carrier component 20. The base component 10 is designed to be placed on a vehicle seat so that the vehicle's seat belt 95 may be placed through the legs 14 of the base component 12 to securely attach the infant seat 10 to the seat.

Figure 2:
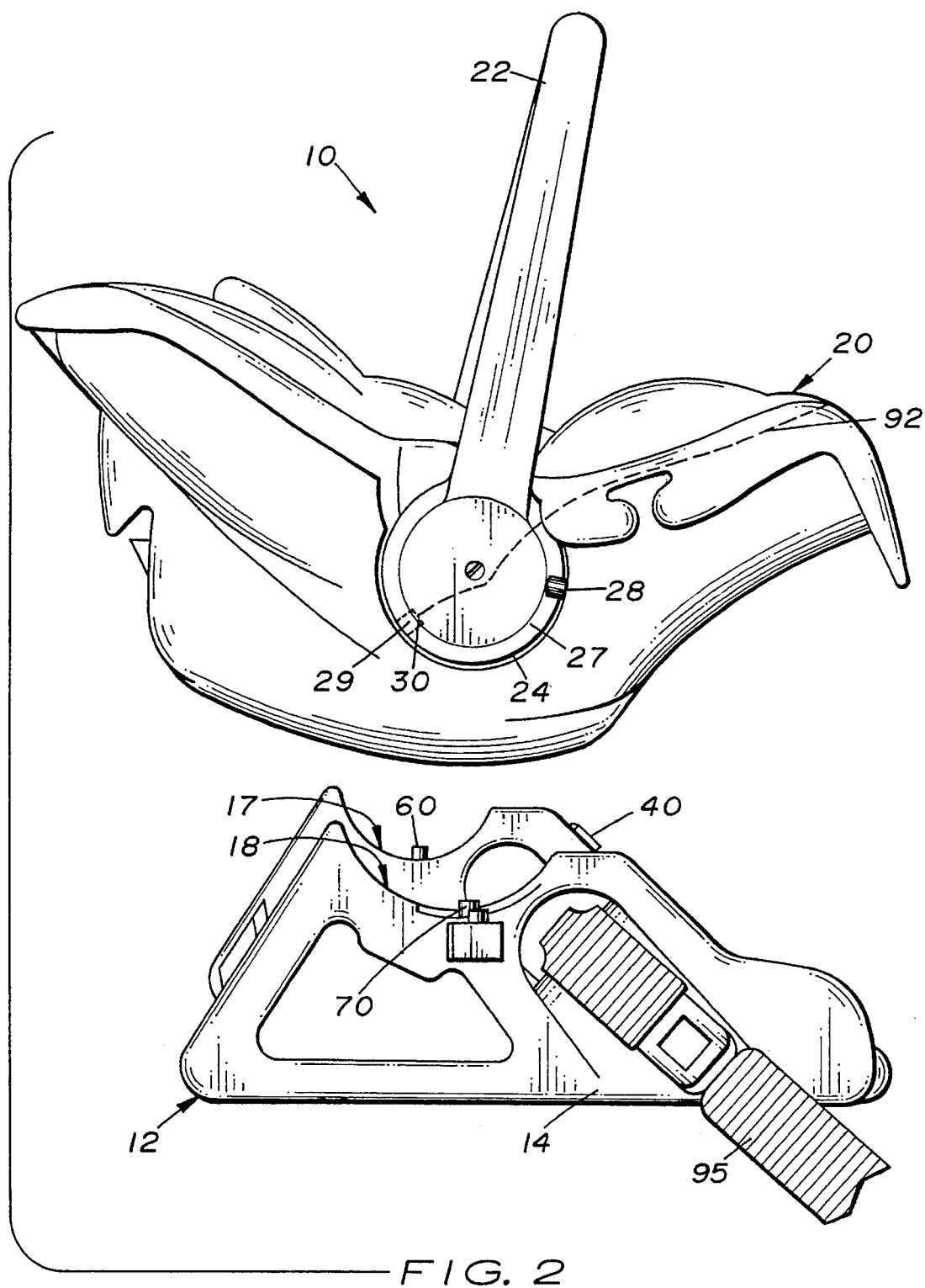
FIG. 2 is a side elevational view of the seat/carrier component separated from the base component.
Figure 3:
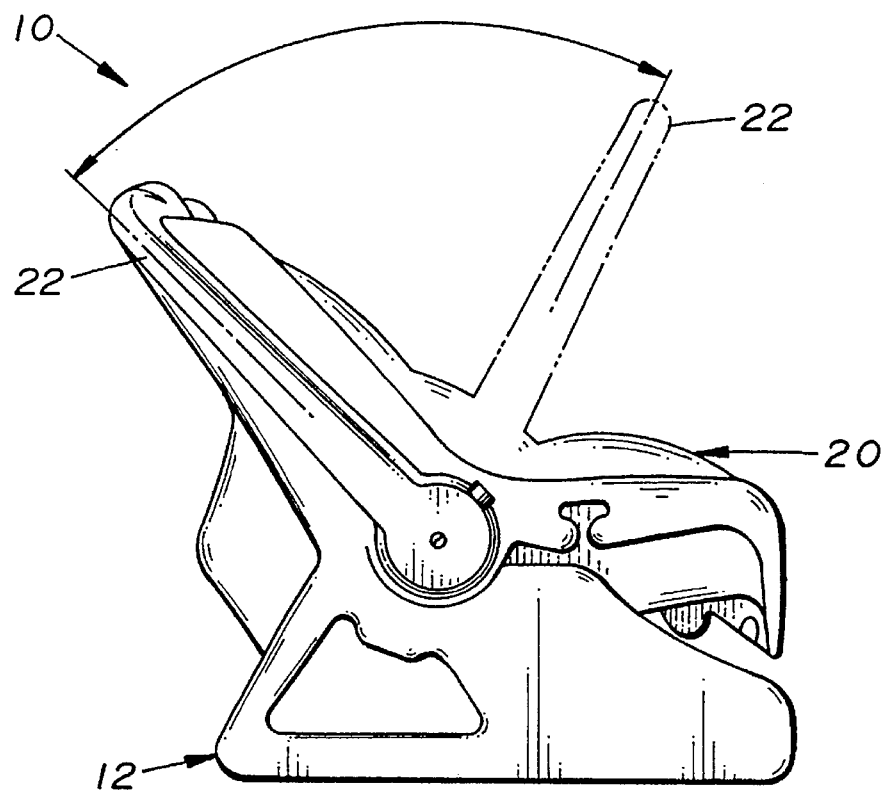
FIG. 3 is a side elevational view of a typical infant vehicle seat carrier showing the movement of the carrier handle.

The seat/carrier component 20 is designed to be removably detached from the base component 12, thereby enabling the seat/carrier component 20 to be transported and used as a carrier or bed. The seat/carrier component 20 includes a bed element 21 and a U-shaped carrying handle 22 which pivots approximately 90 degrees between an upward extended position and a rearward extended position. The ends (end 23 is shown in FIG. 1 and end 24 is shown in FIG. 2) of the carrying handle 22 are round and designed to fit into complimentary shaped round recessed surfaces 17, 18 located on each side of the base component 12. The seat/carrier component 20 is properly aligned on the base component 12 when the ends 23, 24 of the carrying handle 22 are both placed inside the round recessed surfaces 17, 18.

The seat/carrier component 20 is attached to the base component 12 by a locking mechanism 27 located at each end 23 and 24 of the carrying handle 22. The locking mechanism 27 is designed to lock the seat/carrier component 20 to the base component 12 when the ends 23 and 24 of the carrying handle 22 are placed in the base component's round recessed surfaces 17, 18 and then pivoted into a rearward extended position. When the carrying handle 22 is placed in an upward extended position, the seat/carrier component 20 is unlocked from the base component 12, thereby enabling the seat/carrier 20 to be removed therefrom. A push button 28 is used to unlock the carrying handle 22 from the rearward extended position.

The alarm system 8 is designed so that when the seat/carrier component 20 is initially placed onto the base component 12, an alarm means 50 is activated to inform the user that the seat/carrier component 20 is aligned on the base component and in an unlocked state. When the carrying handle 22 is pivoted to the locked state, the alarm system 80 is then designed to warn the user when the harness is in an unused state.

Figure 4:
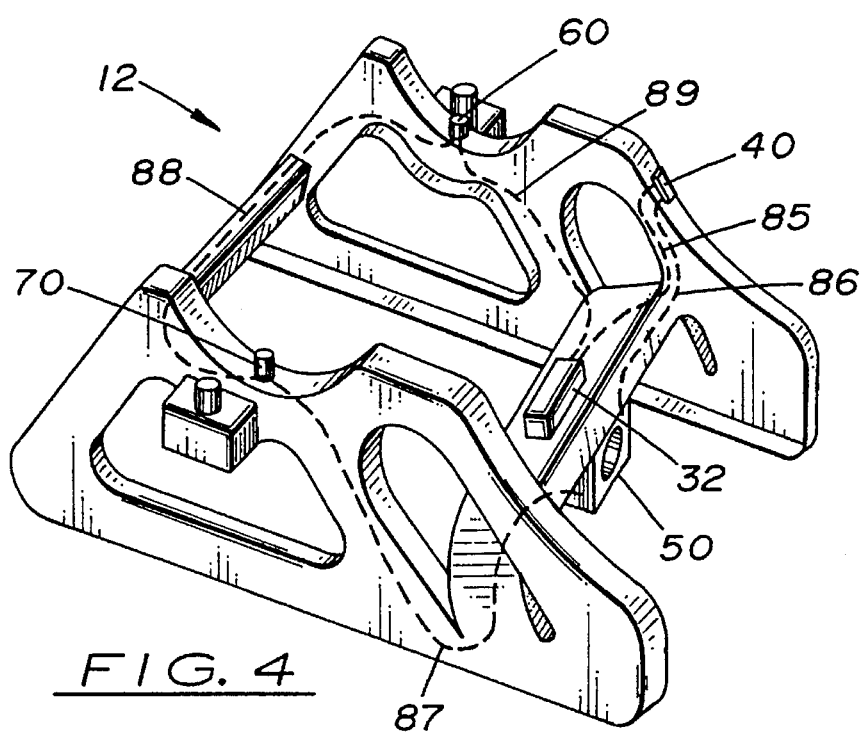
FIG. 4 is a perspective view of the base component showing the placement of the power source, wires and push-button switches located on the base component.
Figure 8:
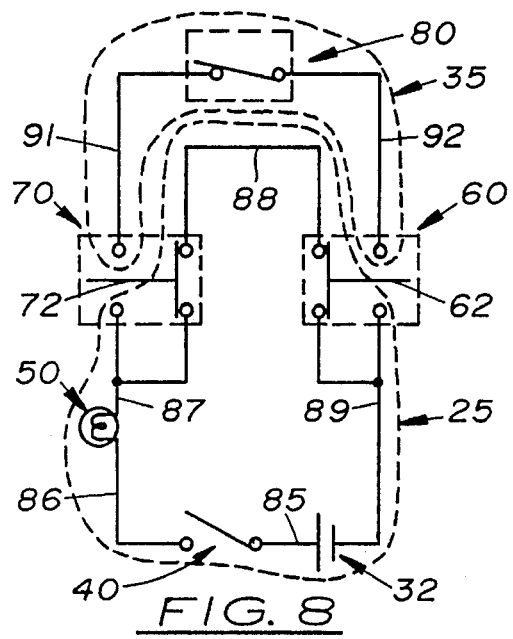
FIG. 8 is a diagrammatical view showing the operating state of the circuit when the main switch is opened and the plungers on the two push button switches are retracted.

Referring now to FIGS. 4 and 8, there is illustrated the base component 12 which houses the main circuit 25 of the alarm system 8. A power source 32, such as a 9 volt battery, a single pole main switch 40, and an alarm means 50, such as a speaker, are attached to the base component 12. Wires 85 and 86 are used to connect the power source 32, main switch 40, and alarm means 50, respectively, in a series. Numerals 60 and 70 designate two double pole switches, such as push-button switches, located on the round recessed surfaces 17 and 18, respectively, on the base component 12. Wire 87 connects the alarm means 50 to the double pole switch 70, wire 88 connects the double pole switch 70 to the double pole switch 60, and wire 89 connects the double pole switch 60 to the power source 32. The main switch 40 is optional so that the main circuit may be selectively opened or closed by the user.

Referring now to FIGS. 5 and 6, each push-button switch (switch 70 shown) includes one contact plunger (plunger 72 shown) which is biased in an upward extended position. When extended upward, a plunger separates from the first contact 30 located on the switch which opens the main circuit 25. When the plunger is pushed inward, it touches the second contact 31 located inside the bore 29 manufactured on the end (end 24 shown) of the carrying handle 22. When the plunger touches the second contact 31, the branching circuit 35 is closed.

During use, the plungers on switches 60 and 70, respectively are forced inward whenever the carrying handle 22 is placed on the round recessed surfaces 17, and 18 respectively. If the main switch 40 is turned ON, the alarm means 50 is active. When the seat/carrier 20 is removed from the base component 12, the plungers extend upward thereby opening the switches 60 and 70. If the main switch is 40 is turned ON, the alarm means 50 is inactive. When the carrying handle 22 is disposed in the locked position, the bore 29 is manufactured so that it is aligned directly over the plunger. In this manner, the plunger automatically extends into the bore 29 whenever the carrying handle 22 is disposed in the locked position.

As discussed above, the set of second contacts 31 are electrically connected to the branching circuit 35. When the plungers of the switches are extended into the bore 29, the plunger contacts the second contacts 31 thereby connecting the main circuit 25 to the branching circuit 35. As shown in FIG. 7, a second switch 80 is disposed inside the lower buckle 46 of the harness 45. The second switch 80 is a single pole switch which is normally closed but opens when the clip 48 is inserted into the buckle 46. Wires (wire 91 shown) connect the second contacts 31 to the second switch 80.

FIG. 8 is a diagrammatical view showing the non-operating state of the system when the main switch 40 is opened and the two push button switches 60 and 70 are closed. The main switch 40 is normally closed so that the seat is in an operative state. The main switch 40 may be opened so that the alarm means 50 is not automatically activated when initially attaching the seat/carrier component 20 to the base component 12. This would be desirable when attaching the seat/carrier 20 to the base component 12 when the infant is sleeping.

Figure 9:
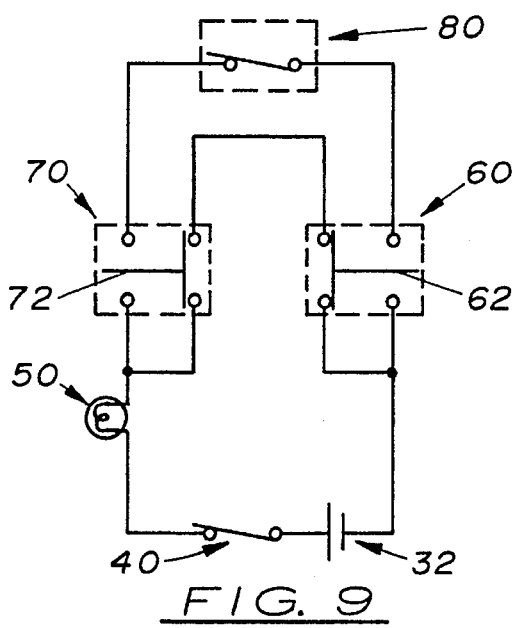
FIG. 9 is a diagrammatical view showing the operating state of the circuit when the main switch is closed and the plungers on the two push button switches are retracted, thereby closing the main circuit and opening the branching circuit.

As illustrated in FIG. 9, when the main switch 40 is closed and the seat/carrier component 20 is aligned and placed on the base component 12, the main circuit 25 is closed thereby activating the alarm means 50.

Figure 10:
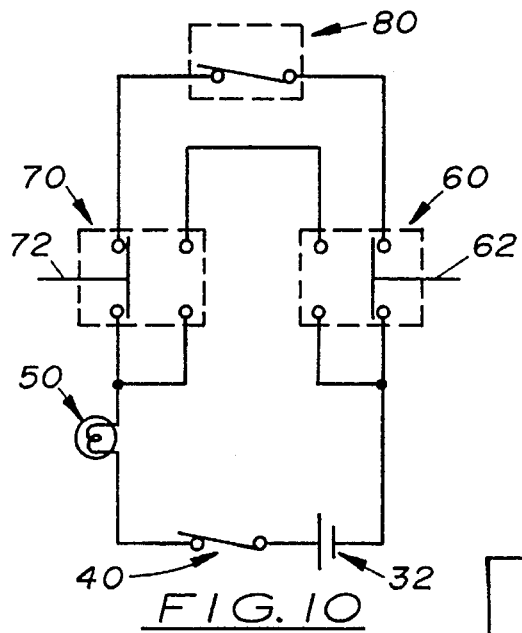
FIG. 10 is a diagrammatical view showing the operating state of the circuit when the main and second switches are closed and the plungers on the two push button switches are extended thereby closing the branching circuit.
Figure 11:
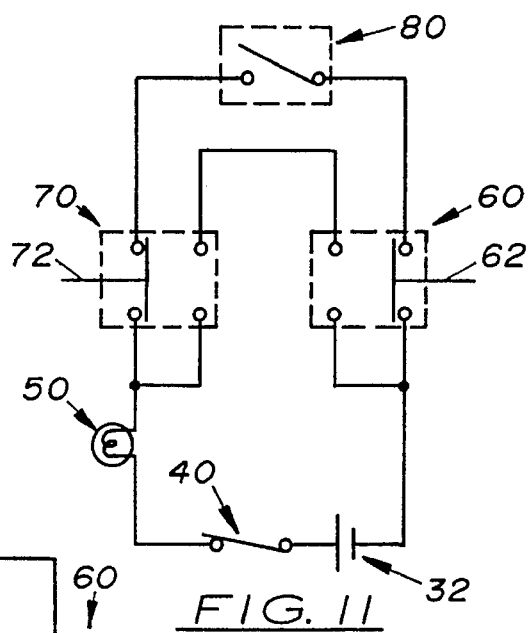
FIG. 11 is a diagrammatical view showing the operating state of the circuit when the main switch is closed, the second switch is opened, and the plungers are extended.

As illustrated in FIG. 10, when the carrying handle 22 is pivoted to the rearward extended position, the first switches 60 and 70 make contact with the second set of contacts 31. The main circuit 25 is opened. If the clip 48 is not inserted into the buckle 46, the branching circuit 35 is closed to operate the alarm means 50. As illustrated in FIG. 11, when the carrying handle 22 is pivoted to the rearward extended position and the clip 48 is inserted into the buckle, both the main and second branching circuit 25 and 35, respectively are opened and the alarm means 50 is inactivated.

Figure 12:
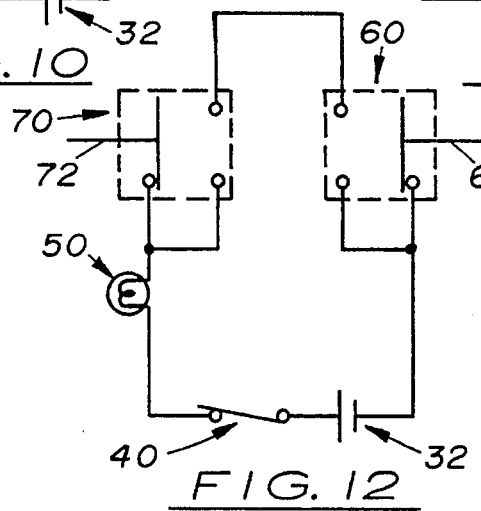
FIG. 12 is a diagrammatical view showing the operating state of the circuit when the main switch is closed and the seat/carrier component is removed from the base component.

As shown in FIG. 12, when the seat/carrier component 20 is removed from the base component 12, the whole circuit is in an opened or off condition independent of switches 60, 70 and 80, and, accordingly, the alarm means 50 is inactive.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

We claim:

1. An alarm system for an infant seat/carrier including a seat/carrier component and a base component, said seat/carrier component including a carrying handle which may be selectively pivoted between an upward extended position and a rearward extended position when said seat/carrier component is properly aligned on said base component, when said carrying handle is pivoted into a rearward extended position, said seat/carrier component is locked onto said base component, said seat/carrier component also including a harness capable of being selectively connected to securely attach an infant to said seat/carrier component, said alarm system comprising:

a. main circuit including a power source, a main switch and an alarm means all connected together in a series;

b. a branching circuit connected to said main circuit, said branching circuit including a second switch means capable of selectively opening and closing said branching circuit, said second switch means attached to said harness so that when said harness is in an used state, said second switch means is opened thereby opening said branching circuit, said second switch means also attached to said harness so that when said harness is in an unused state, said second switching means is closed thereby closing said branching circuit and activating said alarm means; and, c. at least one double pole switch connected between said main circuit and said branching circuit, said double pole switch capable of being disposed in a first contact position to simultaneously close said main circuit and open said branching circuit, said double pole switch also capable of being disposed in a second contact position to simultaneously open said main circuit and close said branching circuit, said double pole switch being disposed between said base component and said carrying handle on said seat/carrier component so that when said seat/carrier component is initially aligned on said base component, said double pole switch is disposed in a first contact position, said double pole also being disposed between said base component and said carrying handle so that when said carrying handle is pivoted to a rearward extending position to lock said seat/carrier component on said base component, said double pole switch is disposed in a second contact position.

2. An alarm system according to claim 1, wherein said double pole switch is a double pole push-button switch, said push-button switch including a first set of contacts connected to said main circuit and including in a second set of contacts connected to said branching circuit.

* * * * *